(12) United States Patent
Maly

(10) Patent No.: US 7,418,568 B2
(45) Date of Patent: Aug. 26, 2008

(54) MEMORY MANAGEMENT TECHNIQUE

(75) Inventor: Gennady Maly, Karlsruhe (DE)

(73) Assignee: SAP AG, Walldorf (DE)

( * ) Notice: Subject to any disclaimer, the term of this patent is extended or adjusted under 35 U.S.C. 154(b) by 229 days.

(21) Appl. No.: 11/030,015

(22) Filed: Jan. 5, 2005

(65) Prior Publication Data

US 2006/0149915 A1 Jul. 6, 2006

(51) Int. Cl.
*G06F 12/00* (2006.01)
(52) U.S. Cl. .................. 711/171; 711/170; 711/173
(58) Field of Classification Search ............. 711/172
See application file for complete search history.

(56) References Cited

U.S. PATENT DOCUMENTS

| | | | |
|---|---|---|---|
| 5,491,810 A | * | 2/1996 | Allen ............... 711/117 |
| 5,809,539 A | | 9/1998 | Sakakibara et al. |
| 5,889,996 A | * | 3/1999 | Adams ............... 717/139 |
| 5,940,868 A | | 8/1999 | Wagner |
| 6,023,281 A | | 2/2000 | Grigor et al. |
| 6,131,150 A | | 10/2000 | DeTreville |
| 6,260,233 B1 | | 7/2001 | Wareham et al. |
| 6,401,181 B1 | | 6/2002 | Franaszek et al. |
| 6,457,112 B2 | | 9/2002 | Hostetter |
| 6,629,111 B1 | | 9/2003 | Stine et al. |
| 6,754,771 B2 | | 6/2004 | Vincent |
| 6,804,612 B2 | | 10/2004 | Chow et al. |
| 6,804,761 B1 | | 10/2004 | Chen et al. |
| 6,832,303 B2 | | 12/2004 | Tanaka |

* cited by examiner

*Primary Examiner*—Reginald G. Bragdon
*Assistant Examiner*—Eric S Cardwell
(74) *Attorney, Agent, or Firm*—Mintz, Levin, Cohn, Ferris, Glovsky & Popeo, P.C.; Michael D. Van Loy

(57) ABSTRACT

Methods for allocating memory by a memory manager for an application are provided. The method may include the steps of allocating a first block size for a first amount of data, and allocating a second block size for memory allocated after the first amount of data. In some variations, the second block size is larger than the first block size. Subsequent block sizes may be also be allocated depending on the desired implementation and based on various threshold criteria. Related apparatuses, computer program products and computer systems are also provided.

21 Claims, 2 Drawing Sheets

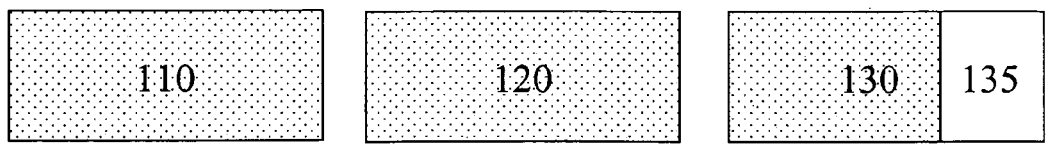
100  FIG. 1
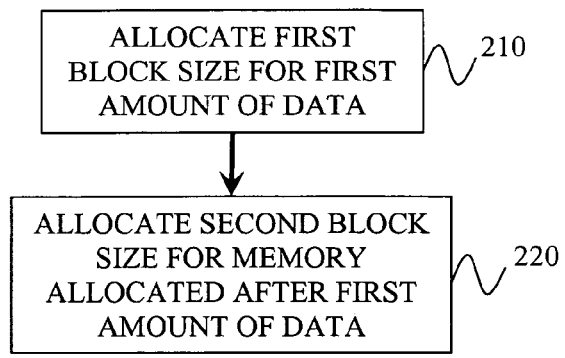
200  FIG. 2
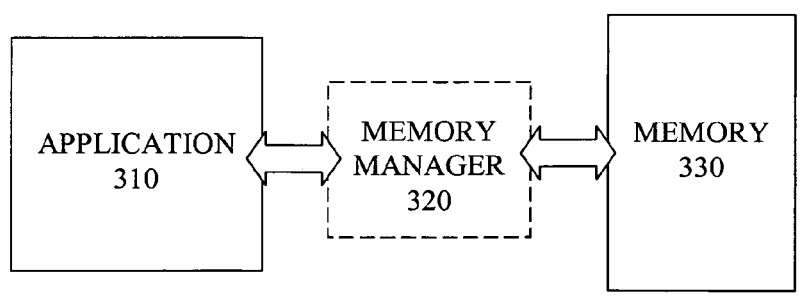
300  FIG. 3

MEMORY MANAGEMENT TECHNIQUE

TECHNICAL FIELD

This invention relates to memory allocation.

BACKGROUND

Dynamic memory allocation occurs when applications determine where to store information during runtime. Such information is stored within discrete regions of memory (typically expressed in the form "memory blocks") the size of which is based on the data being processed and is unknown in advance. In order to allocate memory blocks during run-time, memory managers (e.g., block allocators) are used to allocate blocks of memory (i.e., discrete regions of memory) to an application upon request for activities such as sorting variables, code, or data, etc. Memory managers are also used to deallocate allocated memory blocks after the application requirements cease. After receiving a request for memory from the application, a memory manager must choose a suitable memory block and hand it over, or fail. When a block of memory is no longer needed, it may be recycled by being used for one of subsequent allocations (via, for example, a refresh operation), or by being returned to the operating system.

In some cases, memory that would otherwise be available may not be used due to a previous allocation of memory blocks. This restriction may be the result of either external or internal memory fragmentation. External memory fragmentation occurs when the largest available block of free memory is too small to hold a given object of size X, although the total amount of free memory is larger than X. Such external memory fragmentation results in space between memory blocks that contain no useful data. Internal memory fragmentation occurs when the smallest available block of free memory for an object size Y has size Z, where Z is larger than Y, and results in unused space between the last byte of a block and the first byte of a next block.

For example, with reference to FIG. 1, a conventional memory manager 100 is illustrated that consists of three blocks 110, 120, 130, each of 1024 bytes. The first two blocks 110, 120 and a part of the third block 130 are occupied, meaning that an application has already requested memory from the allocator. At the end of the third block, some free space 135 is ready for further requests. If the remainder is used up, the memory manager 100 requests further blocks from the operating system and then forwards them block by block to the application as requested.

One application that utilizes memory managers is an index server that forms part of a search engine service. In operation, the index serve creates one or more memory managers during a search call and then subsequently deletes the memory managers. At the beginning of a search call, the amount of main memory that will be required is unknown. For example, a search query may result in anywhere from zero to several thousand hits (e.g., objects), each of which requires memory allocation. Having numerous operations in parallel may result in dozens to thousands of simultaneous search calls consuming large amounts of memory (e.g., several gigabytes).

If the block size is too small, the performance of the engine in responding to the search call may be suboptimal because the memory manager allocated many blocks in succession to satisfy the search call memory requirements. Such an operation may be disadvantageous as it may result in (i) numerous memory allocation requests to the operating system; (ii) an unnecessarily large internal block list identifying the allocated blocks; and (iii) wasted memory space due to external and/or internal fragmentation. All of these factors increase processing consumption and increase the amount of time needed to process a search call, thereby resulting in increased expenses. In addition, if the index server handles many search calls in parallel and each of them wastes memory, the index server may act as a bottleneck and adversely affect overall performance.

Some conventional memory managers assign blocks that are based on the size requested by an application. However, with such arrangements, the steps involved to ultimately allocate the memory blocks can consume excessive processing power and slow task completion when there are a large number of requests.

Therefore, it should be appreciated that there remains a need for an improved method and apparatus for allocating memory blocks.

SUMMARY

The invention may be embodied in a method for allocating memory for an application comprising allocating a first block size of the memory to a determined first amount of data and allocating a second block size of the memory for memory allocated after the first amount of data.

The first amount of data may be based on a variety of factors. Sample factors include a number of objects (i.e., processed objects saved by a memory manager), a frequency of memory calls from the application, an amount of available main memory, an amount of consumed main memory, a flag set within a memory manager and the like. Similar factors may be utilized to determine the first and/or block sizes.

The first and/or second block sizes may be predetermined or they may be determined during run-time. If they are determined during run-time, the requirements of the application may be taken into account when determining the size of the memory blocks to be allocated. The second block size (and any subsequent block sizes) may be larger than the preceding block size (e.g., twice as large, a magnitude larger, etc.). Alternatively or in addition to, the block sizes may be based on a number of objects (i.e., processed objects), a frequency of memory calls from the application, an amount of available main memory, an amount of consumed main memory, a flag set within a memory manager and the like.

The method may also comprise the steps of allocating a third block size for memory allocated after a second amount of data. In some variations, the third block size is larger than the second block size. The third block size may be based on many factors such as those used to determine the first and/or second block sizes. Any number of additional block sizes and/or criteria for setting the thresholds for changing block sizes may be implemented.

The method may further comprise the step of generating a memory manager having a flag, the flag defining whether the block size may be changed. With this variation, the flag provides an indication of when block size may be changed so that factors associated with the requirements of an application need not necessarily be monitored.

The method may comprise the step of generating a memory manager identifying the predetermined number of objects or other factors that may be used to determine block size and/or amounts of data to be allocated for a particular block size.

An apparatus is also provided that comprises a memory manager coupled to an application and memory having an assignment unit. The assignment unit allocates a first block size for a first amount of data, the first amount of data being determined during run-time, and allocates a second block size for memory allocated after the first amount of data.

Computer program products for allocating memory, which may be embodied on computer readable-material, are also described. Such computer program products include executable instructions that cause a computer system to conduct one or more of the method steps described herein.

Similarly, computer systems are also provided for allocating memory. These computer systems may include a processor and a memory coupled to the processor. The memory may encode one or more programs that cause the processor to perform one or more of the method steps described herein.

The details of one or more embodiments of the invention are set forth in the accompanying drawings and the description below. Other features, objects, and advantages of the subject matter described herein will be apparent from the description and drawings, and from the claims.

DESCRIPTION OF DRAWINGS

FIG. 1 illustrates a plurality of memory blocks in which one memory block is not fully utilized;

FIG. 2 is a process flow diagram of a method for allocating memory by a memory manager for an application;

FIG. 3 is a schematic illustrating a memory manager in relation to an application and memory.

Like reference symbols in the various drawings indicate like elements.

DETAILED DESCRIPTION

Figure 4:
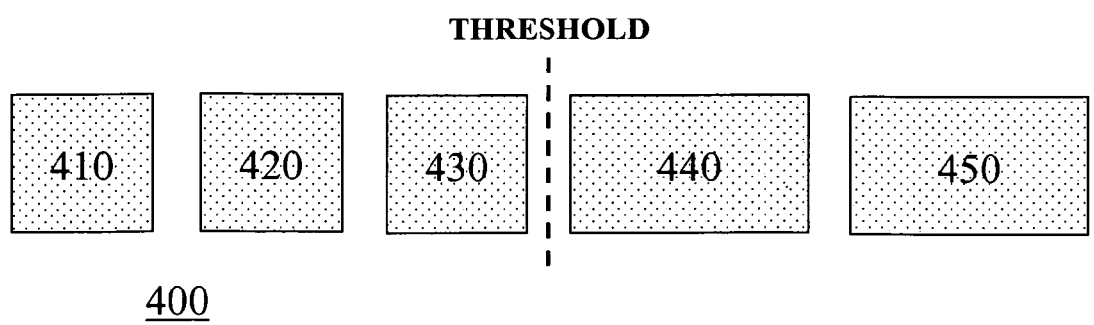
FIG. 4 illustrates a plurality of memory blocks having a first fixed block size before a threshold and a second larger fixed block size after the threshold.

FIG. 2 is a process flow diagram illustrating a method 200 for allocating memory for an application. The method 200 allocates, at step 210, a first block size for a determined first amount of data. Subsequently, at step 220, the method 200 allocates a second block size for memory allocated after the first amount of data. In some variations, the second block size may be larger than the first block size. In other variations, the second block size may be incrementally larger or may even be smaller depending on the desired configuration and/or implementation.

A method in which a predetermined number of objects is the basis for the differing block sizes rather than an amount of data is also provided (although it will be appreciated by the skilled artisan that the amount of data may be proportional to the number of objects). Such an interrelated method may include the steps of allocating a first block size for a predetermined number of objects, and allocating a second block size for all objects after the predetermined number of objects have been allocated to the first block size.

FIG. 3 illustrates an apparatus 300 that allocates memory for an application. The apparatus 300 includes an application module 310, a memory manager module 320, and a memory 330. While the memory manager module 320 is illustrated as a separate from the application module 310, it will be appreciated that it may be integrated or otherwise coupled to the application module 310. The memory manager module 320 receives requests from the application module 310 (as applications associated therewith require a location to store information). The memory manager may allocate memory blocks of a first size for a first fixed amount (which may be based on factors such as data, number of objects, etc.), and thereafter allocate memory blocks of a differing size. Multiple shifts in block size may be realized by using successive criteria for changing memory block size.

The following provides optional variations for understanding and implementing the subject matter described herein. These variations may be combined where appropriate or may be added singly to the methods and apparatus described herein.

FIG. 4 illustrates a sample memory allocation 400 by a memory manager in which a first block size is allocated to several blocks 410, 420, 430 during run-time up to and until a threshold is reached. Thereafter, a second block size 440, 450 is allocated. In some variations, additional thresholds are incorporated which also affect the size of blocks allocated after such threshold. For example, a third block size may be allocated for memory allocated after a second amount of data.

The threshold for determining when to change block size may be based on numerous factors. It may be based on the amount of memory consumed, the amount of memory available, the number of objects processed by an application, the frequency of memory calls from the application, and similar factors. Alternatively, an object for memory allocation may be flagged which would cause each block thereafter to be changed as if a threshold was surpassed. This flag might be indicative of the factors described above or it may be simply a predetermined hard-coded value causing the allocated block size to change.

The subject matter described herein may be implemented in digital electronic circuitry, or in computer hardware, firmware, software, or in combinations of them. Apparatus of the subject matter described herein may be implemented in a computer program product tangibly embodied in an information carrier, e.g., in a machine-readable storage device, for execution by a programmable processor; and method steps of the subject matter described herein may be performed by a programmable processor executing a program of instructions to perform functions of the subject matter described herein by operating on input data and generating output. The subject matter described herein may be implemented in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

A number of embodiments of the invention have been described. Nevertheless, it will be understood that various modifications may be made without departing from the scope of the invention. For example, the memory allocation techniques described herein may be used as part of a standalone system or they may be used on a network node that is coupled to multi-user network such as a LAN, WAN, or other type of distributed computing network. Accordingly, other embodiments are within the scope of the following claims.

What is claimed is:

1. A method comprising:
   receiving a data allocation request from an application at a memory manager that controls allocation of a memory based on one or more factors pertaining to the memory;
   allocating a first block size of the memory to one or more first blocks for a determined first amount of application data; and
   allocating a second block size of the memory to one or more second blocks allocated after the first amount of application data, the second block size being smaller than the first block size if the memory manager determines that internal fragmentation of the memory is likely to occur based on the one or more factors and larger than the first block size if the memory manager determines that external fragmentation of the memory is likely to occur based on the one or more factors.

2. The method of claim 1, wherein the one or more factors comprises a number of objects saved in the memory manager.

3. The method of claim 1, wherein the one or more factors comprises a frequency of memory calls from the application.

4. The method of claim 1, wherein the one or more factors comprises an amount of the memory that is available.

5. The method of claim 1, wherein the one or more factors comprises an amount of the memory that has been consumed.

6. The method of claim 1, wherein the one or more factors comprises a flag set within the memory manager.

7. The method of claim 6, wherein the flag identifies the number of objects to be processed.

8. The method of claim 6, wherein the flag identifies an amount of memory to be consumed.

9. The method of claim 1, wherein the first block size is predetermined.

10. The method of claim 1, wherein the first and second block sizes are determined during run time.

11. The method of claim 1, further comprising allocating a third block size to one or more third blocks allocated after a second amount of data, wherein the third block size is larger than the second block size.

12. The method of claim 1, further comprising generating a memory manager having a flag, the flag defining when to change from the first block size to the second block size.

13. The method of claim 1, wherein the second block size is based on a factor chosen from the group comprising: a number of objects saved, a frequency of memory calls from the application, an amount of available main memory, an amount of consumed main memory, and a flag set within a memory manager.

14. The method of claim 1, wherein the second block size is at least twice the first block size.

15. An apparatus comprising:
   a processor that implements a memory manager coupled to an application and a memory having an assignment unit, the assignment unit configured to allocate one or more first blocks of the memory for a determined first amount of data and one or more second blocks of the memory after the first amount of data, the one or more first blocks having a first block size and the one or more second blocks having a second block size that is different than the first block size, the first and second block sizes being determined based on one or more factors pertaining to usage of the memory, the one or more factors comprising indications that internal or external fragmentation of the memory is likely.

16. The apparatus of claim 15, wherein the one or more factors is chosen from a group consisting of a number of objects, a frequency of memory calls from the application, an amount of available main memory, an amount of consumed main memory, and a flag set within a memory manager.

17. The apparatus of claim 15, wherein the second block size is larger than the first block size.

18. The apparatus of claim 15, wherein the assignment unit allocates one or more third blocks of the memory having a third block size after a second amount of data, the third block size being larger than the second block size.

19. A computer program product, tangibly embodied on a machine-readable storage device, that includes executable instructions for causing a computer system to:
   receive a data allocation request from an application at a memory manager that controls allocation of a memory based on one or more factors pertaining to the memory;
   allocate a first block size of the memory to one or more first blocks for a determined first amount of application data; and
   allocate a second block size of the memory to one or more second blocks allocated after the first amount of application data, the second block size being smaller than the first block size if the memory manager determines that internal fragmentation of the memory is likely to occur based on the one or more factors and larger than the first block size if the memory manager determines that external fragmentation of the memory is likely to occur based on the one or more factors.

20. A method comprising:
   receiving an allocation request from an application at a memory manager module that manages allocation of a memory;
   determining, within the memory manger, whether internal or external fragmentation of the memory is likely to occur based on an observed pattern of memory usage; and
   allocating one or more blocks of the memory for the application, the one or more blocks having a first block size if internal fragmentation is determined to be likely and a second block size if external fragmentation is determined to be likely, the second block size being larger than the first block size.

21. A method as in claim 20, wherein the determining whether internal or external fragmentation of the memory is likely to occur comprises analyzing one or more of an amount of the memory consumed by the application, an amount of the memory that is available for use, a number of objects processed by the application, and a frequency of memory calls by the application.

* * * * *